(12) United States Patent
Dai et al.

(10) Patent No.: US 10,036,875 B2
(45) Date of Patent: Jul. 31, 2018

(54) WIDE-ANGLE IMAGING LENS

(71) Applicant: ZHEJIANG SUNNY OPTICS CO., LTD., Ningbo, Zhejiang (CN)

(72) Inventors: Fujian Dai, Zhejiang (CN); Lin Huang, Zhejiang (CN)

(73) Assignee: ZHEJIANG SUNNY OPTICS CO., LTD., Ningbo, Zhejiang (CN)

( * ) Notice: Subject to any disclaimer, the term of this patent is extended or adjusted under 35 U.S.C. 154(b) by 0 days.

(21) Appl. No.: 15/504,652

(22) PCT Filed: Nov. 11, 2015

(86) PCT No.: PCT/CN2015/094329
§ 371 (c)(1),
(2) Date: Feb. 16, 2017

(87) PCT Pub. No.: WO2016/179986
PCT Pub. Date: Nov. 17, 2016

(65) Prior Publication Data
US 2017/0227741 A1    Aug. 10, 2017

(30) Foreign Application Priority Data

May 8, 2015  (CN) .......................... 2015 1 0233355

(51) Int. Cl.
*G02B 13/00*    (2006.01)
*G02B 9/60*    (2006.01)

(52) U.S. Cl.
CPC ........... *G02B 13/0045* (2013.01); *G02B 9/60* (2013.01)

(58) Field of Classification Search
CPC .. G02B 13/0045; G02B 9/60; G02B 27/0025; G02B 13/18; G02B 5/005; G02B 5/208;
(Continued)

(56) References Cited

U.S. PATENT DOCUMENTS

| 8,873,165 | B1 | 10/2014 | Chung et al. |
| 2013/0182339 | A1* | 7/2013 | Sekine ..................... G02B 9/60 |
| | | | 359/764 |
| 2016/0282588 | A1* | 9/2016 | Sekine ..................... G02B 9/60 |
| | | | 359/764 |

FOREIGN PATENT DOCUMENTS

| CN | 102466858 A | 5/2012 |
| CN | 103246049 A | 8/2013 |

(Continued)

OTHER PUBLICATIONS

International search report for PCT application CN2015094329.
English translation of international search report for PCT application CN2015094329.

*Primary Examiner* — Bumsuk Won
*Assistant Examiner* — Grant Gagnon
(74) *Attorney, Agent, or Firm* — Kile Park Reed & Houtteman PLLC

(57) ABSTRACT

Provided is a wide-angle imaging lens, including a first lens, a second lens, a third lens, a fourth lens and a fifth lens from an object side of the wide-angle imaging lens to an image side of the wide-angle imaging lens in turn. The first lens is of a focal power, an object side surface of the first lens close to an axis is concave; the second lens is of a focal power, an image side surface of the second lens is concave; the third lens is of a positive focal power, an image side surface of the third lens is convex; the fourth lens is of a negative focal power, an object side surface of the fourth lens is concave and in a meniscus shape; the fifth lens is of a focal power, an object side surface of the fifth lens close to the axis is convex.

15 Claims, 10 Drawing Sheets

(58) Field of Classification Search
CPC .. G02B 13/002; G02B 13/06; G02B 13/0015; G02B 13/04; G02B 1/041; G02B 13/004; G02B 3/04; G02B 9/62; G02B 13/02; H04N 5/2254; H04N 5/2253; H04N 5/225; H04N 5/2258; H04N 13/0282; H04N 2101/00; H04N 5/2252; H04N 5/2257; H04N 5/232; H04N 5/23212; H04N 5/23296; H04N 5/2351; H04N 5/374; H04N 9/045; H01L 27/14625; Y10T 29/4913
USPC .......................................................... 359/714
See application file for complete search history.

(56) References Cited

FOREIGN PATENT DOCUMENTS

| | | |
|---|---|---|
| CN | 103576287 A | 2/2014 |
| JP | 2015011050 A | 1/2015 |

* cited by examiner

WIDE-ANGLE IMAGING LENS

CROSS-REFERENCE TO RELATED APPLICATION

The application is the U.S. national phase of PCT Application No. PCT/CN2015/094329 filed on Nov. 11, 2015, which claims a priority to and benefits of Chinese Patent Applications No. 201510233355.X, filed with the State Intellectual Property Office of P. R. China on May 8, 2015, the entire contents of which are incorporated herein by reference.

FIELD

The present disclosure relates to an imaging technology, in particularly to a wide-angle imaging lens.

BACKGROUND

With the developments in technology, portable electronic products are more and more popular, especially those with a camera function. A photosensitive unit of a common optical system includes a charge-coupled device (CCD) or a complementary metal-oxide semiconductor (CMOS). With the improvements in the technology of a semiconductor manufacture process, the photosensitive unit is of an increasing smaller pixel size. Correspondingly, it requires a smaller image lens adapted for the photosensitive unit and guaranteeing high imaging quality at the same time. In the past, the imaging quality is commonly improved by adding lenses, which is, however, adversely affects miniaturization of the imaging lens. In addition, the field angle is narrowed for improving the imaging quality, which is also adversely affects a wide-angle feature of the imaging lens.

SUMMARY

Embodiments of the present disclosure seek to solve at least one of the problems existing in the related art.

A wide-angle imaging lens according to the present disclosure includes a first lens, a second lens, a third lens, a fourth lens and a fifth lens from an object side of the wide-angle imaging lens to an image side of the wide-angle imaging lens in turn, wherein the first lens is of a focal power, an object side surface of the first lens close to an axis is concave;

the second lens is of a focal power, an image side surface of the second lens is concave;

the third lens is of a positive focal power, an image side surface of the third lens is convex;

the fourth lens is of a negative focal power, an object side surface of the fourth lens is concave and in a meniscus shape;

the fifth lens is of a focal power, an object side surface of the fifth lens close to the axis is convex, and at least one inflection point is present in at least one of the object side surface and an image side surface of the fifth lens; and the wide-angle imaging lens meets the following formulas:

$$TTL/ImgH<1.7; \text{ and}$$

$$-1.4<f/f4<0,$$

wherein TTL is a total length of the wide-angle imaging lens,

ImgH equals to half of a diameter of an effective pixel region at an imaging side surface, f represents an effective focal length of the wide-angle imaging lens, and f4 represents an effective focal length of the fourth lens.

In some embodiments, the wide-angle imaging lens includes an aperture stop arranged between the second lens and the third lens.

In some embodiments, the wide-angle imaging lens meets the following formula:

$$25<V1-V2<45,$$

wherein V1 represents a dispersion coefficient of the first lens and V2 represents a dispersion coefficient of the second lens.

In some embodiments, the wide-angle imaging lens meets the following formula:

$$0<Drlr4/TTL<0.25,$$

wherein Drlr4 represents a distance from the object side surface of the first lens to the image side surface of the second lens along the axial direction, and TTL is the total length of the wide-angle imaging lens.

In some embodiments, the wide-angle imaging lens meets the following formula:

$$|SAG41/SD41|\geq 0.56,$$

wherein SAG41 is a vector height of the object side surface of the fourth lens, and SD41 is a maximal effective radius of the object side surface of the fourth lens.

In some embodiments, the wide-angle imaging lens meets the following formula:

$$\tan(HFOV)/TTL>0.32 \text{ mm}^{-1},$$

wherein HFOV is half of a maximal field angle of the wide-angle imaging lens, and TTL is the total length of the wide-angle imaging lens.

In some embodiments, the fifth lens is of a positive focal power, and an image side surface of the fifth lens close to the axis is concave.

In some embodiments, an object side surface of the second lens is convex.

In some embodiments, an image side surface of the first lens close to the axis is convex.

In some embodiments, an object side surface of the third lens is convex.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
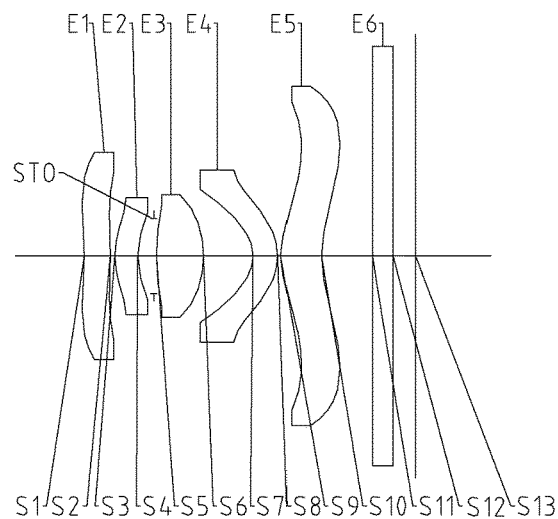
FIG. 1 is a schematic view showing the wide-angle imaging lens according to Example 1 of the present disclosure.
Figure 2:
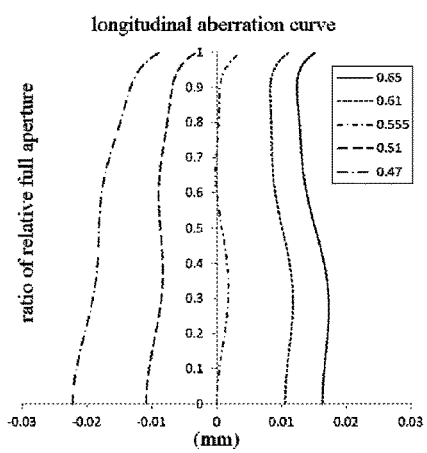
FIG. 2 is a diagram showing a longitudinal aberration curve (mm) of the wide-angle imaging lens in Example 1.
Figure 3:
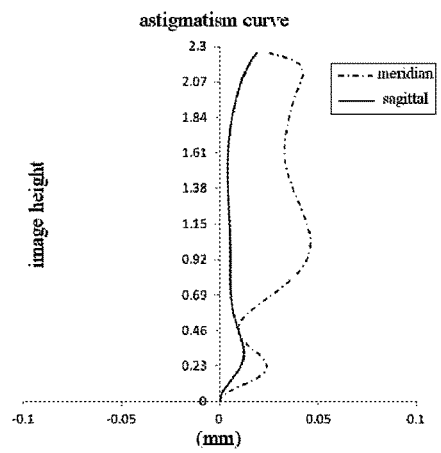
FIG. 3 is a diagram showing an astigmatism curve (mm) of the wide-angle imaging lens in Example 1.
Figure 4:
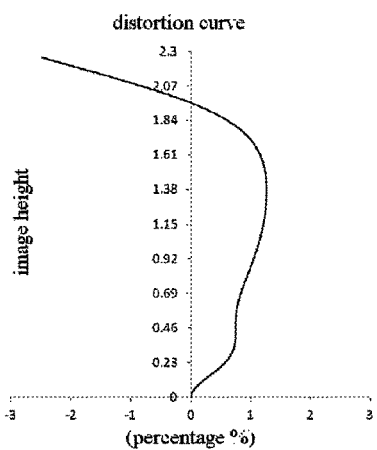
FIG. 4 is a diagram showing a distortion curve (%) of the wide-angle imaging lens in Example 1.
Figure 5:
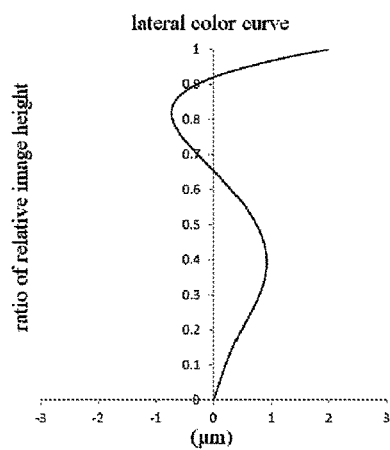
FIG. 5 is a diagram showing a lateral color curve (μm) of the wide-angle imaging lens in Example 1.
Figure 6:
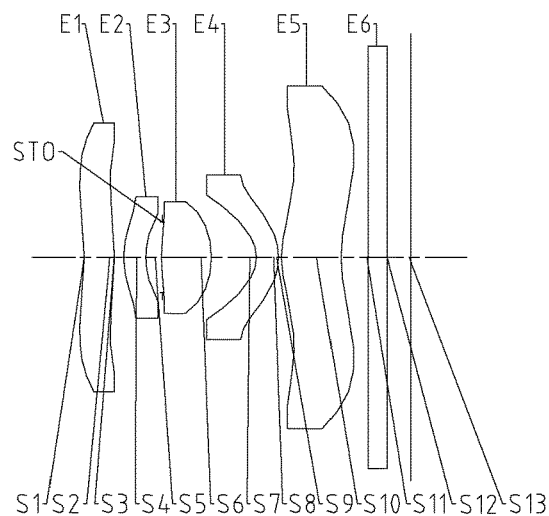
FIG. 6 is a schematic view showing the wide-angle imaging lens according to Example 2 of the present disclosure.
Figure 7:
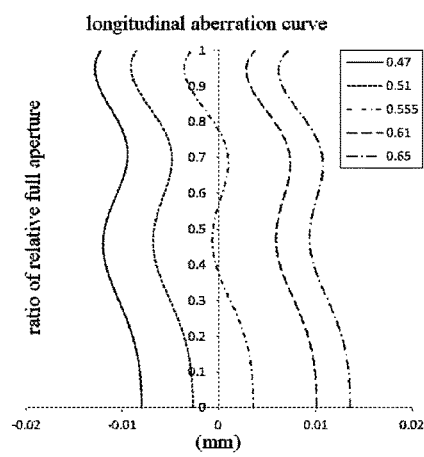
FIG. 7 is a diagram showing a longitudinal aberration curve (mm) of the wide-angle imaging lens in Example 2.
Figure 8:
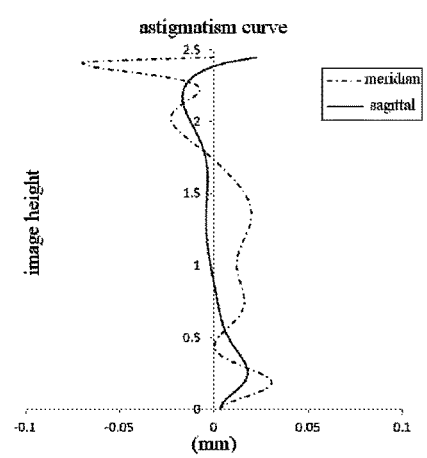
FIG. 8 is a diagram showing an astigmatism curve (mm) of the wide-angle imaging lens in Example 2.
Figure 9:
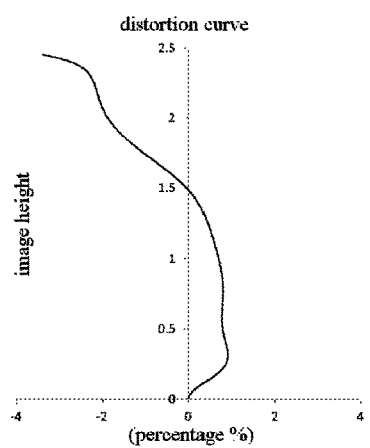
FIG. 9 is a diagram showing a distortion curve (%) of the wide-angle imaging lens in Example 2.
Figure 10:
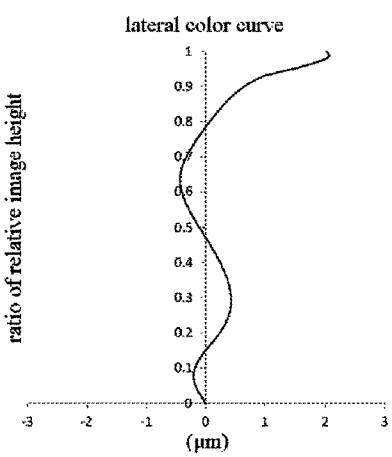
FIG. 10 is a diagram showing a lateral color curve (μm) of the wide-angle imaging lens in Example 2.
Figure 11:
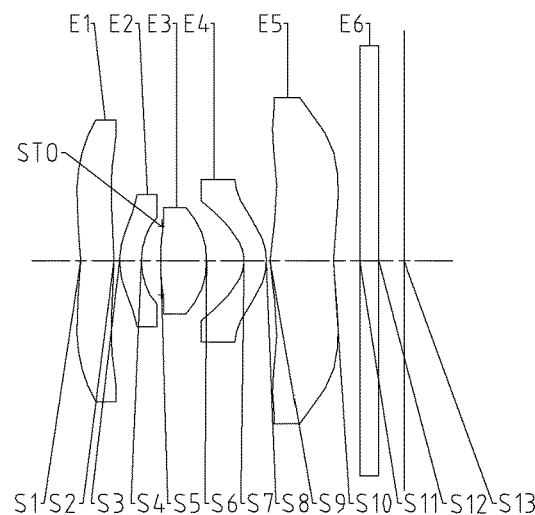
FIG. 11 is a schematic view showing the wide-angle imaging lens according to Example 3 of the present disclosure.
Figure 12:
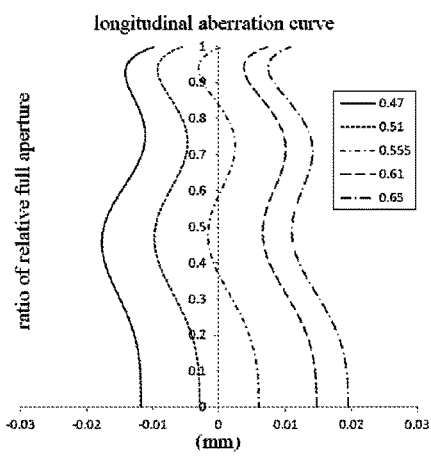
FIG. 12 is a diagram showing a longitudinal aberration curve (mm) of the wide-angle imaging lens in Example 3.
Figure 13:
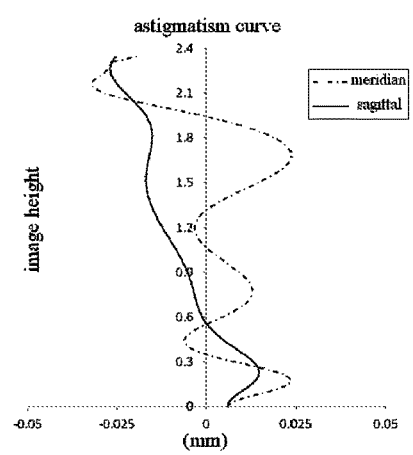
FIG. 13 is a diagram showing an astigmatism curve (mm) of the wide-angle imaging lens in Example 3.
Figure 14:
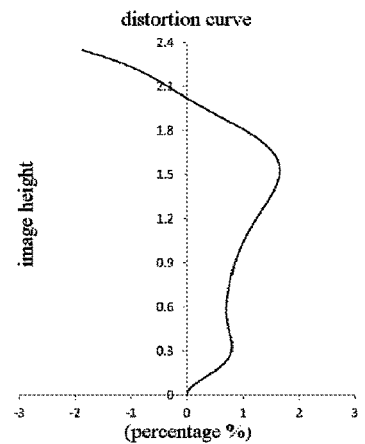
FIG. 14 is a diagram showing a distortion curve (%) of the wide-angle imaging lens in Example 3.
Figure 15:
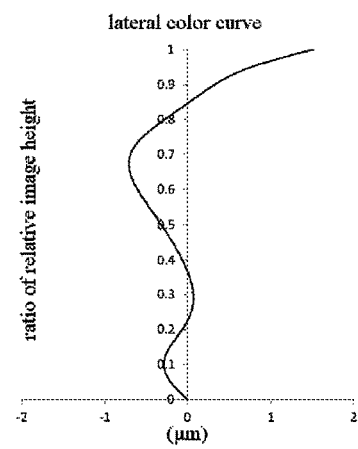
FIG. 15 is a diagram showing a lateral color curve (μm) of the wide-angle imaging lens in Example 3.
Figure 16:
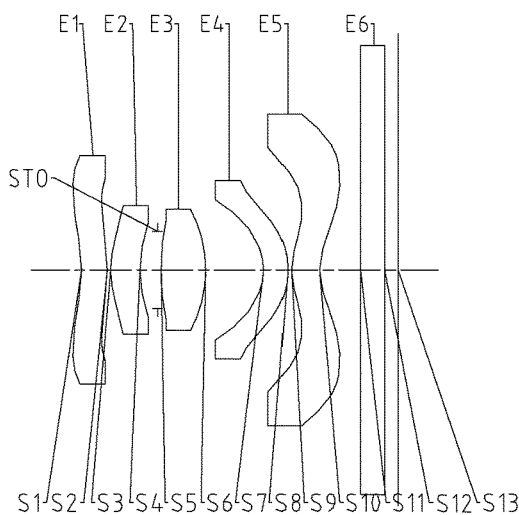
FIG. 16 is a schematic view showing the wide-angle imaging lens according to Example 4 of the present disclosure.
Figure 17:
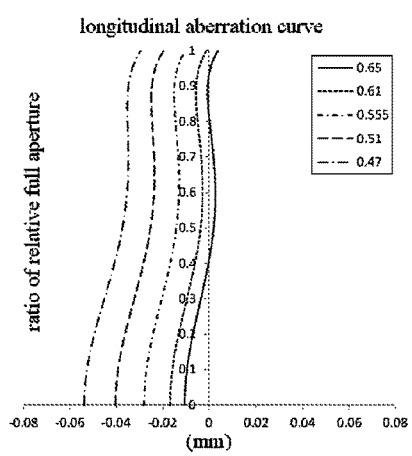
FIG. 17 is a diagram showing a longitudinal aberration curve (mm) of the wide-angle imaging lens in Example 4.
Figure 18:
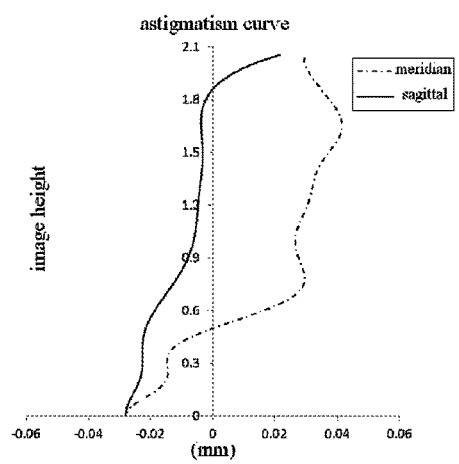
FIG. 18 is a diagram showing an astigmatism curve (mm) of the wide-angle imaging lens in Example 4.
Figure 19:
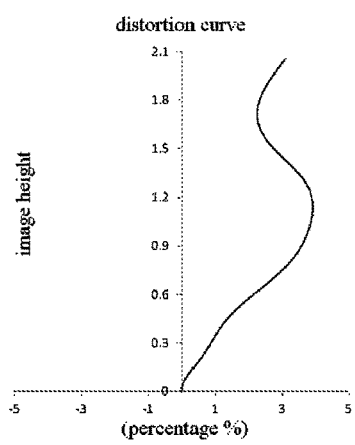
FIG. 19 is a diagram showing a distortion curve (%) of the wide-angle imaging lens in Example 4.
Figure 20:
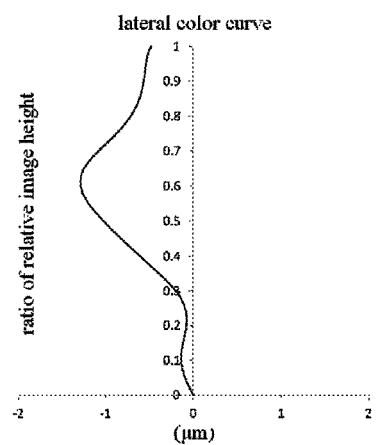
FIG. 20 is a diagram showing a lateral color curve (μm) of the wide-angle imaging lens in Example 4.
Figure 21:
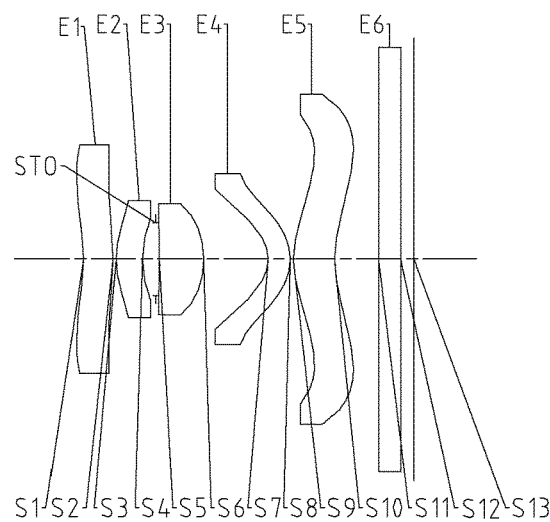
FIG. 21 is a schematic view showing the wide-angle imaging lens according to Example 5 of the present disclosure.
Figure 22:
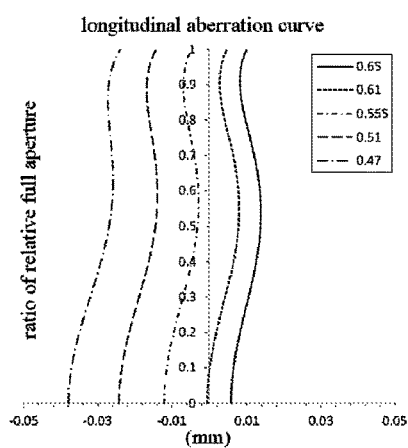
FIG. 22 is a diagram showing a longitudinal aberration curve (mm) of the wide-angle imaging lens in Example 5.
Figure 23:
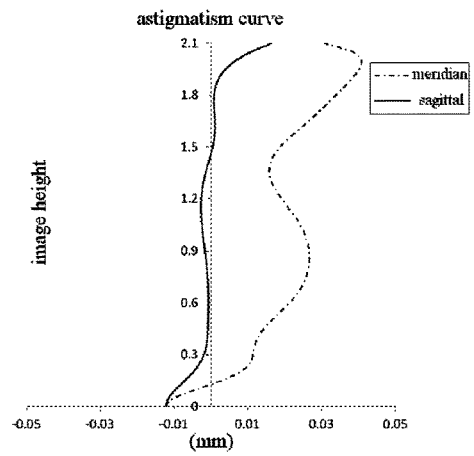
FIG. 23 is a diagram showing an astigmatism curve (mm) of the wide-angle imaging lens in Example 5.
Figure 24:
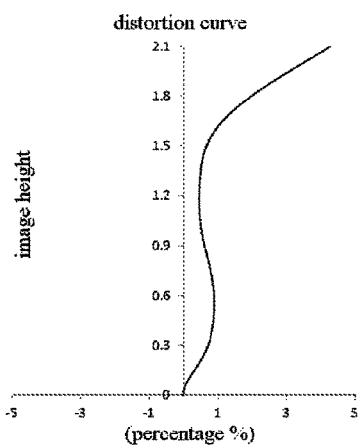
FIG. 24 is a diagram showing a distortion curve (%) of the wide-angle imaging lens in Example 5.
Figure 25:
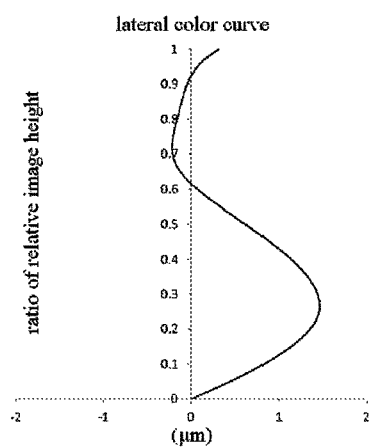
FIG. 25 is a diagram showing a lateral color curve (μm) of the wide-angle imaging lens in Example 5.
Figure 26:
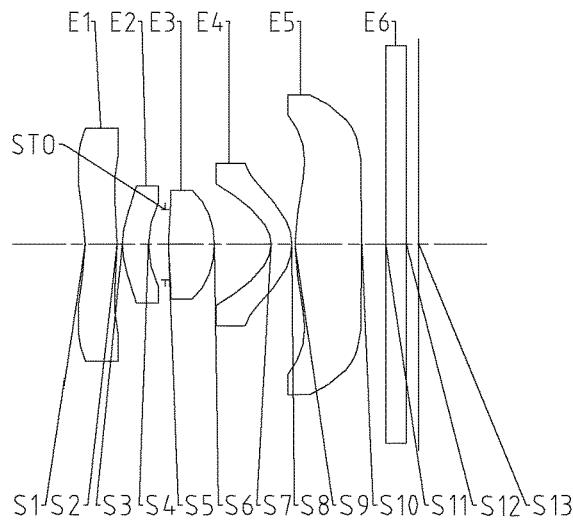
FIG. 26 is a schematic view showing the wide-angle imaging lens according to Example 6 of the present disclosure.
Figure 27:
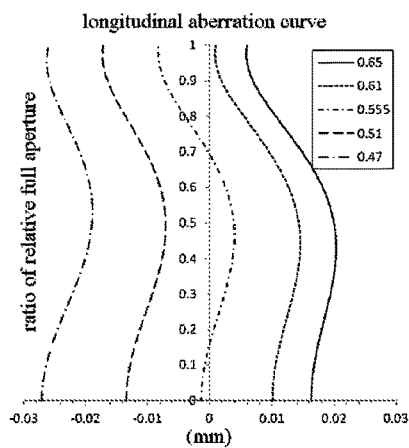
FIG. 27 is a diagram showing a longitudinal aberration curve (mm) of the wide-angle imaging lens in Example 6.
Figure 28:
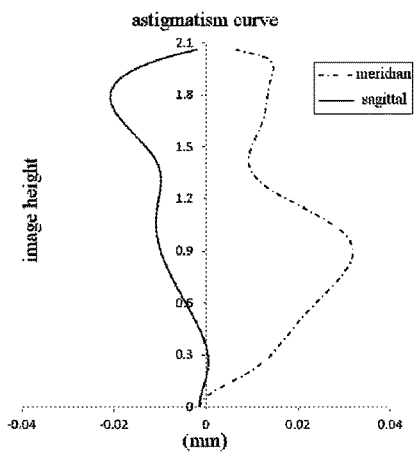
FIG. 28 is a diagram showing an astigmatism curve (mm) of the wide-angle imaging lens in Example 6.
Figure 29:
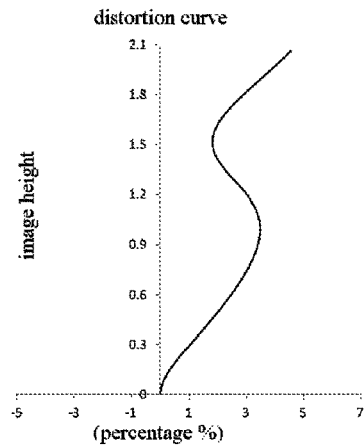
FIG. 29 is a diagram showing a distortion curve (%) of the wide-angle imaging lens in Example 6.
Figure 30:
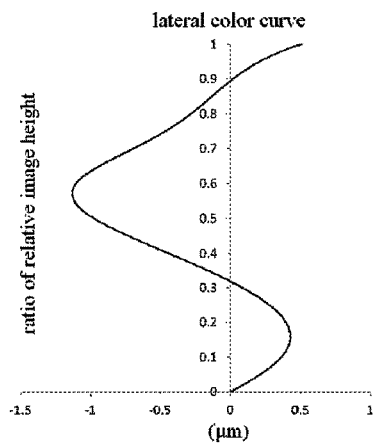
FIG. 30 is a diagram showing a lateral color curve (μm) of the wide-angle imaging lens in Example 6.
Figure 31:
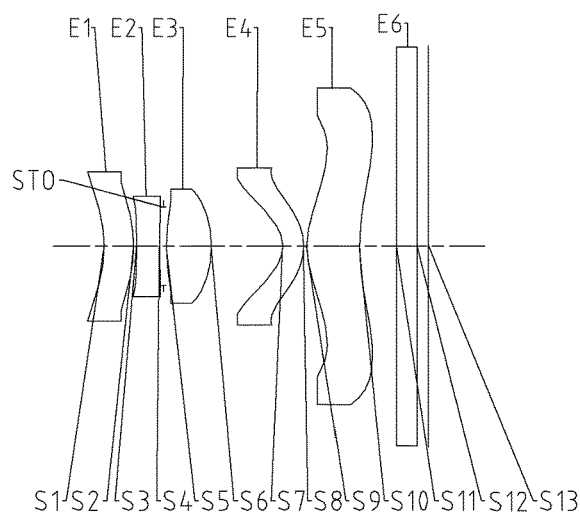
FIG. 31 is a schematic view showing the wide-angle imaging lens according to Example 7 of the present disclosure.
Figure 32:
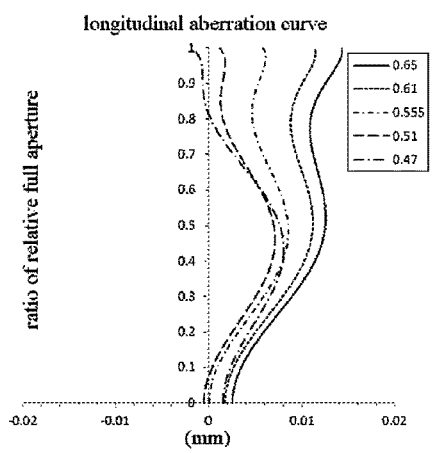
FIG. 32 is a diagram showing a longitudinal aberration curve (mm) of the wide-angle imaging lens in Example 7.
Figure 33:
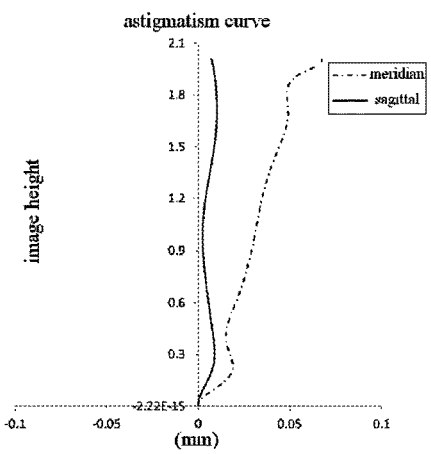
FIG. 33 is a diagram showing an astigmatism curve (mm) of the wide-angle imaging lens in Example 7.
Figure 34:
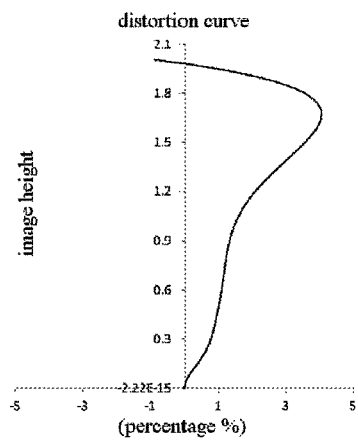
FIG. 34 is a diagram showing a distortion curve (%) of the wide-angle imaging lens in Example 7.
Figure 35:
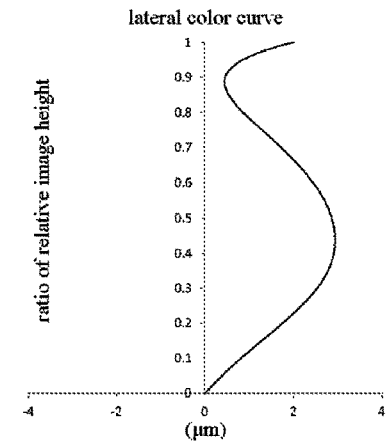
FIG. 35 is a diagram showing a lateral color curve (μm) of the wide-angle imaging lens in Example 7.
Figure 36:
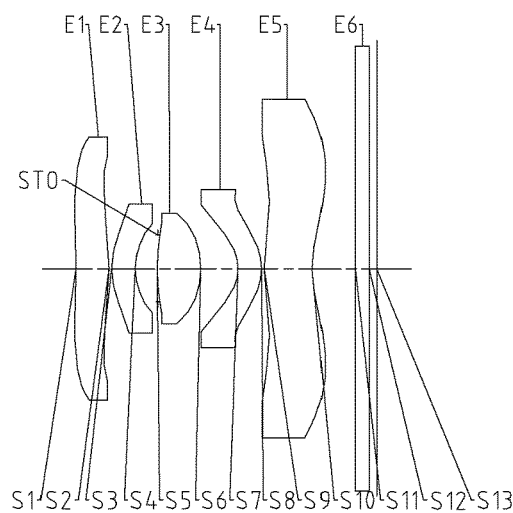
FIG. 36 is a schematic view showing the wide-angle imaging lens according to Example 8 of the present disclosure.
Figure 37:
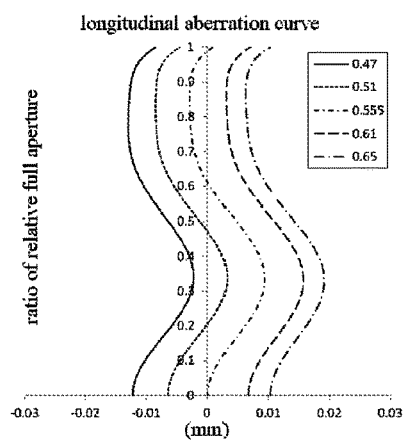
FIG. 37 is a diagram showing a longitudinal aberration curve (mm) of the wide-angle imaging lens in Example 8.
Figure 38:
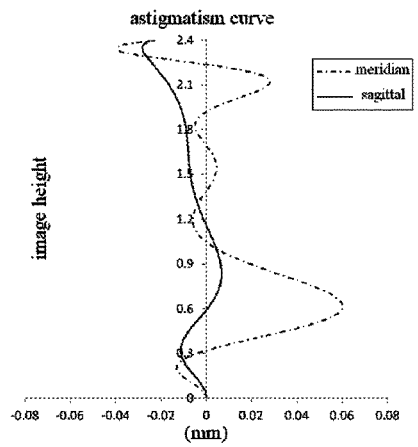
FIG. 38 is a diagram showing an astigmatism curve (mm) of the wide-angle imaging lens in Example 8.
Figure 39:
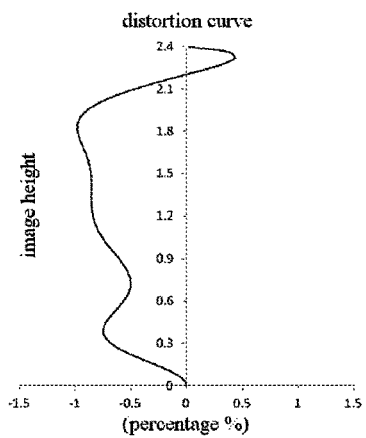
FIG. 39 is a diagram showing a distortion curve (%) of the wide-angle imaging lens in Example 8.
Figure 40:
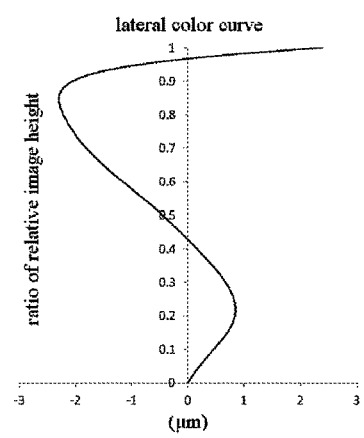
FIG. 40 is a diagram showing a lateral color curve (μm) of the wide-angle imaging lens in Example 8.
Figure 41:
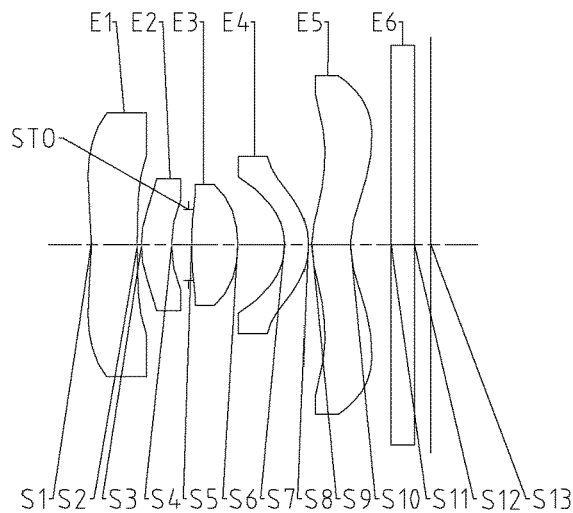
FIG. 41 is a schematic view showing the wide-angle imaging lens according to Example 9 of the present disclosure.
Figure 42:
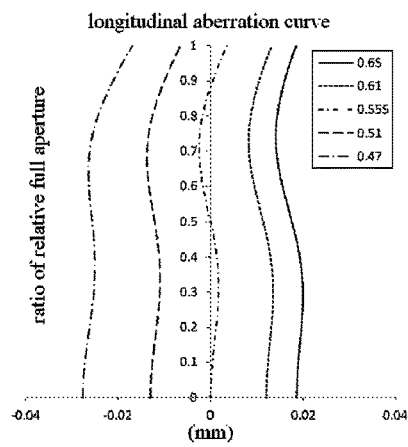
FIG. 42 is a diagram showing a longitudinal aberration curve (mm) of the wide-angle imaging lens in Example 9.
Figure 43:
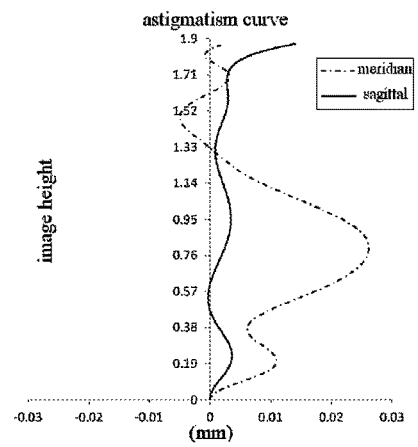
FIG. 43 is a diagram showing an astigmatism curve (mm) of the wide-angle imaging lens in Example 9.
Figure 44:
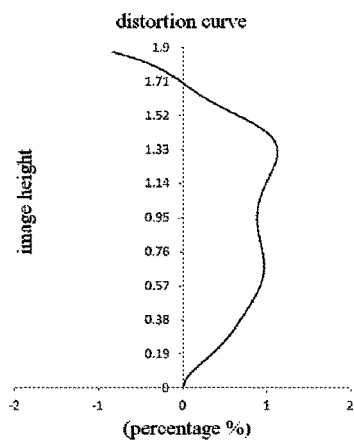
FIG. 44 is a diagram showing a distortion curve (%) of the wide-angle imaging lens in Example 9.
Figure 45:
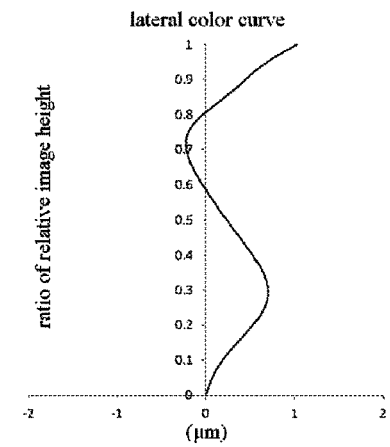
FIG. 45 is a diagram showing a lateral color curve (μm) of the wide-angle imaging lens in Example 9.
Figure 46:
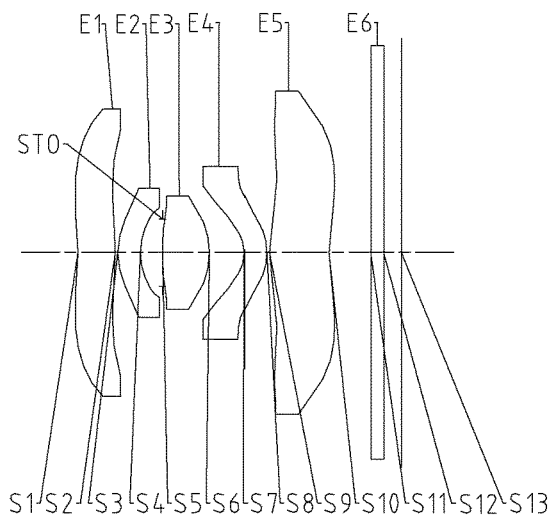
FIG. 46 is a schematic view showing the wide-angle imaging lens according to Example 10 of the present disclosure.
Figure 47:
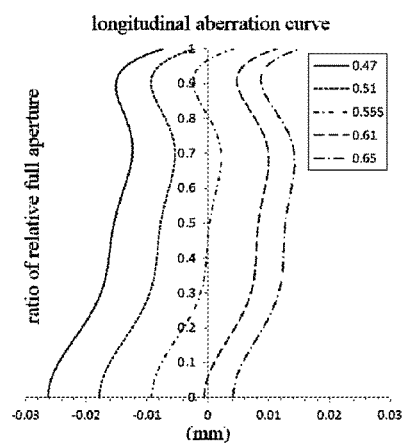
FIG. 47 is a diagram showing a longitudinal aberration curve (mm) of the wide-angle imaging lens in Example 10.
Figure 48:
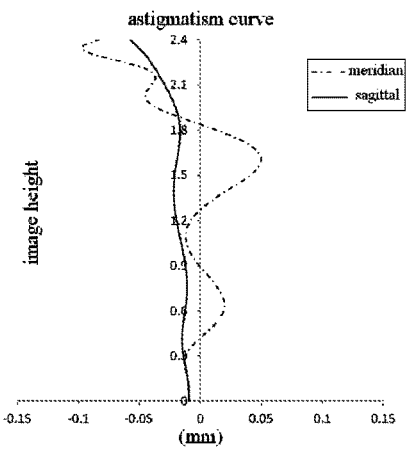
FIG. 48 is a diagram showing an astigmatism curve (mm) of the wide-angle imaging lens in Example 10.
Figure 49:
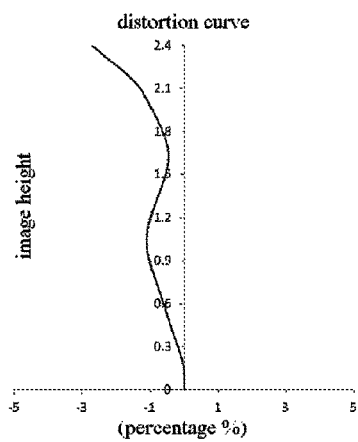
FIG. 49 is a diagram showing a distortion curve (%) of the wide-angle imaging lens in Example 10.
Figure 50:
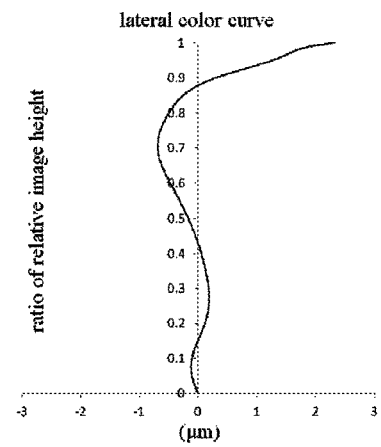
FIG. 50 is a diagram showing a lateral color curve (μm) of the wide-angle imaging lens in Example 10.

Embodiments of the present disclosure will be described in detail in the following descriptions, examples of which are shown in the accompanying drawings, in which the same or similar reference numerals represent the same or similar elements or elements having the same or similar functions throughout the descriptions. The embodiments described hereinafter with reference to the accompanying drawings are explanatory and illustrative, which are used to generally understand the present disclosure, but shall not be construed to limit the present invention.

In the description of the present disclosure, it shall be appreciated that, terms "first", "second" are just used herein for purposes of description and are not intended to indicate or imply relative importance or significance or to imply the number of indicated technical features. Thus, the feature defined with "first" and "second" may explicitly or implicitly include one or more this feature. In the description of the present disclosure, unless specified otherwise, "a plurality of" means two or more than two.

In the description of the present disclosure, it should be noted that, unless otherwise clearly defined and limited, the terms "mounted," "connected", "connection" should be broadly understood, and may be, for example, fixed connections, detachable connections, or integral connections; may also be electrical connections or may communicate with each other; may also be direct connections or indirect connections via intermediation; may also be inner communications or interaction relationship of two elements, which can be understood by those ordinary skilled in the art according to specific situations.

Various embodiments and examples are provided in the following descriptions to implement different structures of the present disclosure. In order to simplify the present disclosure, certain elements and settings will be described. However, these elements and settings are only by way of example and are not intended to limit the present disclosure. In addition, reference numerals and/or reference letters may be repeated in different examples in the present disclosure, this repeating is for the purpose of simplification and clarity and does not refer to relations between different embodiments and/or settings. Furthermore, examples of specific processes and materials are provided in the present disclosure, however, it would be appreciated by those ordinary skilled in the art that other processes and/or materials may be also applied.

With reference to FIG. 1, in an embodiment of the present disclosure, a wide-angle imaging lens includes a first lens E1, a second lens E2, a third lens E3, a fourth lens E4 and a fifth lens E5 from an object side of the wide-angle imaging lens to an image side of the wide-angle imaging lens in turn. The first lens E1 is of a focal power, the second lens E2 is of a focal power, the third lens E3 is of a positive focal power, the fourth lens E4 is of a negative focal power, and the fifth lens E5 is of a focal power. Specifically, the first lens E1 includes an object side surface S1 and an image side surface S2. The second lens E2 includes an object side surface S3 and an image side surface S4. The third lens E3 includes an object side surface S5 and an image side surface S6. The forth lens E4 includes an object side surface S7 and an image side surface S8. The fifth lens E5 includes an object side surface S9 and an image side surface S10.

When imaging, light entering from the object side of the wide-angle imaging lens and passing through a filter E6 including an object side surface S11 and an image side surface S12 is imaged at an imaging side surface S13.

In some embodiments, the object side surface S1 close to an axis is concave, the image side surface S4 is concave, the image side surface S6 is convex, the object side surface S7 is concave and in a meniscus shape, the object side surface S9 close to the axis is convex, and at least one inflection point is present in at least one of the object side surface S9 and the image side surface S10.

The wide-angle imaging lens meets the following formulas:

$TTL/ImgH<1.7$; and $-1.4<f/f4<0$, in which TTL is a total length of the wide-angle imaging lens, ImgH equals to half of a diameter of an effective pixel region at an imaging side surface, f represents an effective focal length of the wide-angle imaging lens, and f4 represents an effective focal length of the fourth lens.

The above formula is satisfied to shorten the total length of the wide-angle imaging lens, ensure the miniaturization and the wide-angle feature of the wide-angle imaging lens, and improve the imaging quality of the wide-angle imaging lens.

The wide-angle imaging lens includes an aperture stop STO arranged between the second lens E2 and the third lens E3.

The wide-angle imaging lens meets the following formula:

$25<V1-V2<45$, in which V1 represents a dispersion coefficient of the first lens and V2 represents a dispersion coefficient of the second lens.

The above formula is satisfied to enlarge the field angle of the wide-angle imaging lens and ensure the wide-angle feature of the wide-angle imaging lens.

The wide-angle imaging lens meets the following formula:

$0<Dr1r4/TTL<0.25$, in which Dr1r4 represents a distance from the object side surface S1 to the image side surface S4.

The above formula is satisfied to be beneficial to the miniaturization of the wide-angle imaging lens.

The wide-angle imaging lens meets the following formula:

$|SAG41/SD41|\geq 0.56$, in which SAG41 is a vector height of the object side surface S9, and SD41 is a maximal effective radius of the object side surface S9.

The above formula is satisfied to enlarge the field angle of the wide-angle imaging lens.

The wide-angle imaging lens meets the following formula:

$\tan(HFOV)/TTL>0.32 \text{ mm}^{-1}$, in which HFOV is half of a maximal field angle of the wide-angle imaging lens.

The above formula is satisfied to ensure the wide-angle imaging lens both the wide-angle feature and the miniaturization.

In some embodiments, the fifth lens E5 is of a positive focal power, and the image side surface S10 close to the axis is concave.

In some embodiments, the object side surface S3 is convex.

In some embodiments, the image side surface S2 close to the axis is convex.

In some embodiments, the object side surface S5 is convex.

The above requirements to the focal power and shape of the lens are satisfied to ensure the wide-angle feature of the wide-angle imaging lens, and at the same time further improve the imaging quality and reduce the total length of the wide-angle imaging lens.

In some embodiments, each of the first lens E1, the second lens E2, the third lens E3, the fourth lens E4 and the fifth lens E5 may be aspheric shape lenses.

A surface shape of the aspheric shape is defined by a formula as follows:

$$x = \frac{ch^2}{1+\sqrt{1-(k+1)c^2h^2}} + \sum Aih^i,$$

in which h is a height from any point on the aspheric shape to an optical axis, c is an apex curvature, k is a conic coefficient, Ai is a coefficient for the i-th order of the aspheric.

Example 1

In example 1, the wide-angle imaging lens meets the conditions of the following tables:

TABLE 1

| No. of surface | Surface type | Curvature radius | Thickness | Material (refractive index/abbe) | Conic coefficient |
|---|---|---|---|---|---|
| OBJ | spherical | infinity | 500 | | |
| S1 | aspheric | −2.2101 | 0.2653 | 1.54, 56.1 | −52.9319 |
| S2 | aspheric | −3.9266 | 0.0458 | | 0.0000 |
| S3 | aspheric | 0.8143 | 0.2345 | 1.64, 23.3 | −4.0119 |
| S4 | aspheric | 0.8085 | 0.1624 | | −1.9300 |
| STO | spherical | infinity | 0.0300 | | |
| S5 | aspheric | 2.8451 | 0.4783 | 1.54, 56.1 | 0.0000 |
| S6 | aspheric | −1.0945 | 0.5064 | | −6.1359 |
| S7 | aspheric | −0.3648 | 0.2500 | 1.64, 23.3 | −3.4344 |
| S8 | aspheric | −0.6179 | 0.0300 | | −0.9251 |
| S9 | aspheric | 0.7193 | 0.4129 | 1.54, 56.1 | −9.7269 |
| S10 | aspheric | 1.1029 | 0.5200 | | −9.8616 |
| S11 | spherical | infinity | 0.2100 | 1.52, 64.2 | |
| S12 | spherical | infinity | 0.2297 | | |
| S13 | spherical | infinity | | | |

TABLE 2

| No. of surface | A4 | A6 | A8 | A10 | A12 | A14 | A16 |
|---|---|---|---|---|---|---|---|
| S1 | 2.9909E−01 | −2.5926E−01 | 1.6019E−01 | −2.7360E−02 | 0.0000E+00 | 0 | 0 |
| S2 | 5.7826E−01 | −1.0252E+00 | 1.1217E+00 | −4.8198E−01 | 0.0000E+00 | 0 | 0 |
| S3 | −9.2564E−03 | −1.3895E−01 | −1.1709E+01 | 3.7189E+01 | −3.4467E+01 | 0 | 0 |
| S4 | −3.2392E−01 | 9.2999E+01 | −1.2889E+01 | 4.3545E+01 | 2.9119E−09 | 0 | 0 |
| S5 | 1.4420E−01 | −4.7971E−01 | 1.1612E+00 | −1.8303E+00 | 0.0000E+00 | 0 | 0 |
| S6 | −7.2069E−01 | 7.4918E−01 | −2.8676E+00 | 2.8588E+00 | 0.0000E+00 | 0 | 0 |
| S7 | −2.9940E+00 | 8.9765E+00 | −1.6776E+01 | 1.3612E+01 | 0.0000E+00 | 0 | 0 |
| S8 | −2.6570E−01 | 9.5234E−01 | −3.4461E−02 | −2.3466E−01 | 0.0000E+00 | 0 | 0 |
| S9 | −5.8651E−02 | −5.3159E−03 | 5.9492E−03 | −2.9350E−03 | 6.2519E−04 | 0 | 0 |
| S10 | −5.7125E−02 | 6.5176E−03 | −3.6019E−03 | 1.0488E−03 | −2.8402E−04 | 0 | 0 |

Furthermore, $f1=-9.79$ mm; $f2=11.88$ mm; $f3=-1.51$ mm; $f4=-2.25$ mm; $f5=2.74$ mm and $f=1.93$ mm; HFOV=50.0°; TTL=3.37 mm; Fno is: 2.4.

Embodiment 2

In example 2, the wide-angle imaging lens meets the conditions of the following tables:

TABLE 4

| No. of surface | A4 | A6 | A8 | A10 | A12 | A14 | A16 |
|---|---|---|---|---|---|---|---|
| S1 | 2.0246E−01 | −2.3753E−01 | 2.1447E−01 | −1.1826E−01 | 3.4415E−02 | −2.4800E−03 | −5.9446E−04 |
| S2 | 4.6176E−01 | −1.0013E+00 | 1.6515E+00 | −1.8034E+00 | 1.2219E+00 | −4.5565E−01 | 7.0337E−02 |
| S3 | −1.7261E−01 | −7.0737E−01 | −1.2789E+00 | 1.2767E+00 | 2.1845E+01 | −5.5451E+01 | 3.9525E+01 |
| S4 | −3.9868E−01 | 2.5452E−01 | 4.5906E+00 | −1.3363E+02 | 1.1718E+03 | −4.2339E+03 | 6.1063E+03 |
| S5 | 7.0127E−02 | 2.8873E−01 | −2.0071E+01 | 2.5640E+02 | −1.7795E+03 | 6.3380E+03 | −9.2867E+03 |
| S6 | −6.6069E−01 | 1.3951E+00 | −1.6603E+01 | 9.0057E+01 | −2.9057E+02 | 4.7850E+02 | −3.3419E+02 |
| S7 | −3.9548E+00 | 1.9652E+01 | −7.4055E+01 | 1.7268E+02 | −1.8226E+02 | −4.5599E+01 | 1.8223E+02 |
| S8 | −9.3942E−01 | 5.7253E+00 | −1.8087E+01 | 3.8879E+01 | −4.9519E+01 | 3.3707E+01 | −9.4536E+00 |
| S9 | −6.6694E−02 | −6.3745E−03 | 3.4908E−03 | 6.5573E−03 | −5.2273E−03 | 1.7685E−03 | −2.2787E−04 |
| S10 | −5.4666E−02 | −4.2789E−03 | 1.8932E−02 | −1.6589E−02 | 6.4739E−03 | −1.2398E−03 | 9.6710E−05 |

TABLE 3

| No. of surface | Surface type | Curvature radius | Thickness | Material (refractive index/abbe) | Conic coefficient |
|---|---|---|---|---|---|
| OBJ | spherical | infinity | 500 | | |
| S1 | aspheric | −2.2335 | 0.3357 | 1.54, 56.1 | −22.2683 |
| S2 | aspheric | −2.5070 | 0.1029 | | −2.9324 |

TABLE 3-continued

| No. of surface | Surface type | Curvature radius | Thickness | Material (refractive index/abbe) | Conic coefficient |
|---|---|---|---|---|---|
| S3 | aspheric | 0.9327 | 0.2465 | 1.64, 23.3 | −1.5822 |
| S4 | aspheric | 0.8299 | 0.1836 | | −0.5149 |
| STO | spherical | infinity | −0.0099 | | |
| S5 | aspheric | 3.1015 | 0.5575 | 1.54, 56.1 | −7.7890 |
| S6 | aspheric | −0.9777 | 0.5019 | | −3.1898 |
| S7 | aspheric | −0.3630 | 0.2452 | 1.64, 23.3 | −3.7636 |
| S8 | aspheric | −0.7168 | 0.0309 | | −0.8863 |
| S9 | aspheric | 0.7907 | 0.6606 | 1.54, 56.1 | −16.2809 |
| S10 | aspheric | 1.7058 | 0.3001 | | −11.0080 |
| S11 | spherical | infinity | 0.2100 | 1.52, 64.2 | |
| S12 | spherical | infinity | 0.2643 | | |
| S13 | spherical | infinity | | | |

Furthermore, $f1=-66.2$ mm; $f2=-192.3$ mm; $f3=1.43$ mm; $f4=-1.57$ mm; $f5=2.15$ mm and $f=1.96$ mm; HFOV=52.3°; TTL=3.63 mm; Fno is: 2.4.

Embodiment 3

In example 3, the wide-angle imaging lens meets the conditions of the following tables:

TABLE 5

| No. of surface | Surface type | Curvature radius | Thickness | Material (refractive index/abbe) | Conic coefficient |
|---|---|---|---|---|---|
| OBJ | spherical | infinity | 500 | | |
| S1 | aspheric | −1.9385 | 0.3803 | 1.54, 56.1 | −29.6767 |
| S2 | aspheric | −2.7045 | 0.0628 | | −1.5819 |
| S3 | aspheric | 0.7690 | 0.2490 | 1.64, 23.3 | −3.5791 |
| S4 | aspheric | 0.7211 | 0.2330 | | −1.2276 |
| STO | spherical | infinity | −0.0139 | | |
| S5 | aspheric | 3.0673 | 0.5253 | 1.54, 56.1 | −1.1400 |
| S6 | aspheric | −0.9416 | 0.4270 | | −4.4404 |
| S7 | aspheric | −0.3736 | 0.2528 | 1.64, 23.3 | −4.3892 |
| S8 | aspheric | −0.7062 | 0.0431 | | −0.8866 |
| S9 | aspheric | 0.9682 | 0.7163 | 1.54, 56.1 | −25.3449 |
| S10 | aspheric | 2.2952 | 0.3000 | | −7.7015 |
| S11 | spherical | infinity | 0.2100 | 1.52, 64.2 | |
| S12 | spherical | infinity | 0.2921 | | |
| S13 | spherical | infinity | | | |

TABLE 6

| No. of surface | A4 | A6 | A8 | A10 | A12 | A14 | A16 |
|---|---|---|---|---|---|---|---|
| S1 | 2.1267E−01 | −1.9278E−01 | 1.1541E−01 | −3.3383E−02 | −1.3188E−03 | 3.4602E−03 | −6.2628E−04 |
| S2 | 5.1000E−01 | −9.6625E−01 | 1.2764E+00 | −1.0976E+00 | 5.8290E−01 | −1.7183E−01 | 2.1328E−02 |
| S3 | 2.6798E−01 | −1.2417E+00 | 8.1688E−01 | −1.3343E+01 | 7.1488E+01 | −1.3400E+02 | 8.7205E+01 |
| S4 | −3.6679E−01 | −7.7229E−01 | 8.3054E+00 | −1.2461E+02 | 9.0415E+02 | −3.1998E+04 | 4.5906E+04 |
| S5 | 2.9837E−02 | −5.9830E−01 | 2.6267E+01 | −3.7306E+02 | 2.6132E+03 | −8.6550E+03 | 1.0929E+04 |
| S6 | −8.4226E−01 | 8.1622E−01 | −1.4701E+00 | −3.0137E+01 | 2.5142E+02 | −8.0069E+02 | 9.7289E+02 |
| S7 | −5.0876E+00 | 3.2566E+01 | −1.4635E+02 | 4.4156E+02 | −7.9539E+02 | 7.0360E+02 | −1.8994E+02 |
| S8 | −9.4690E−01 | 5.7468E+00 | −1.4119E+01 | 2.6017E+01 | −3.1878E+01 | 2.1609E+01 | −6.0543E+00 |
| S9 | −2.6904E−01 | 4.6287E−01 | −5.6462E−01 | 4.0344E−01 | −1.6022E−01 | 3.3225E−02 | −2.8224E−03 |
| S10 | −2.8406E−01 | 2.9548E−01 | −2.2067E−01 | 1.0790E−01 | −3.5167E−02 | 6.7458E−03 | −5.4883E−04 |

Furthermore, f1=−15.2 mm; f2=17.33 mm; f3=1.38 mm; f4=−1.75 mm; f5=2.58 mm and f=1.94 mm; HFOV=52.6°; TTL=3.68 mm; Fno is: 2.4.

Embodiment 4

In example 4, the wide-angle imaging lens meets the conditions of the following tables:

TABLE 8

| No. of surface | A4 | A6 | A8 | A10 | A12 | A14 | A16 |
|---|---|---|---|---|---|---|---|
| S1 | 2.5448E−01 | −2.1064E−01 | 1.8202E−01 | −4.0348E−02 | −1.2807E−02 | 4.1464E−04 | 1.5061E−02 |
| S2 | 7.4514E−01 | −1.0038E+00 | 1.1590E+00 | −3.7931E−01 | −8.9221E−02 | −4.5777E−01 | 9.0769E−01 |
| S3 | −4.9241E−02 | 1.4807E−01 | −1.0815E+01 | 3.3226E+01 | −3.0864E+01 | −1.0117E−08 | −5.5329E−09 |
| S4 | −4.3240E−01 | 1.1333E+00 | −1.0195E+01 | 4.2170E+01 | −4.8271E−09 | 3.0584E−10 | −2.0072E−11 |
| S5 | 1.0132E−01 | 4.8592E−01 | −4.8295E−01 | 3.6557E−01 | 4.7928E−09 | 8.8825E−10 | 6.5327E−12 |
| S6 | −5.6894E−01 | 9.9334E−01 | −4.3310E−01 | 9.6858E+00 | 7.7205E−09 | −1.8290E−09 | −8.5031E−10 |
| S7 | −3.1301E+00 | 7.5513E+00 | −1.5404E+01 | 2.0129E+01 | −1.3415E+01 | −4.2782E−09 | 3.8176E−09 |
| S8 | −6.4285E−01 | 1.2122E+00 | 4.0453E−01 | 2.1721E−01 | 3.7131E−01 | −1.9226E−02 | −1.9487E+00 |
| S9 | −5.4339E−01 | −1.8882E+00 | 7.3545E+00 | −1.1365E+01 | 8.3080E+00 | −2.4778E+00 | 1.2769E−01 |
| S10 | −9.2581E−01 | 1.3066E+00 | −1.3385E+00 | 9.6880E−01 | −5.0574E−01 | 1.6054E−01 | −2.1614E−02 |

TABLE 7

| No. of surface | Surface type | Curvature radius | Thickness | Material (refractive index/abbe) | Conic coefficient |
|---|---|---|---|---|---|
| OBJ | spherical | infinity | 500 | | |
| S1 | aspheric | −1.1670 | 0.2244 | 1.54, 56.1 | −14.7859 |
| S2 | aspheric | −1.6293 | 0.0304 | | 0.0000 |

TABLE 7-continued

| No. of surface | Surface type | Curvature radius | Thickness | Material (refractive index/abbe) | Conic coefficient |
|---|---|---|---|---|---|
| S3 | aspheric | 0.8221 | 0.2550 | 1.64, 23.3 | −5.1077 |
| S4 | aspheric | 0.9539 | 0.1554 | | −2.8864 |
| STO | spherical | infinity | 0.0300 | | |
| S5 | aspheric | 2.5626 | 0.3880 | 1.54, 56.1 | 0.0000 |
| S6 | aspheric | −1.1611 | 0.5058 | | −5.7069 |
| S7 | aspheric | −0.4665 | 0.2100 | 1.64, 23.3 | −6.3215 |
| S8 | aspheric | −0.6938 | 0.0300 | | −0.6483 |
| S9 | aspheric | 0.5463 | 0.2436 | 1.54, 56.1 | −6.8278 |
| S10 | aspheric | 0.5492 | 0.3589 | | −2.8083 |
| S11 | spherical | infinity | 0.2100 | 1.52, 64.2 | |
| S12 | spherical | infinity | 0.1178 | | |
| S13 | spherical | infinity | | | |

Furthermore, f1=−9.09 mm; f2=5.26 mm; f3=1.52 mm; f4=−3.47 mm; f5=6.18 mm and f=1.62 mm; HFOV=50.2°; TTL=2.76 mm; Fno is: 2.4.

Embodiment 5

In example 5, the wide-angle imaging lens meets the conditions of the following tables:

TABLE 9

| No. of surface | Surface type | Curvature radius | Thickness | Material (refractive index/abbe) | Conic coefficient |
|---|---|---|---|---|---|
| OBJ | spherical | infinity | 500 | | |
| S1 | aspheric | −1.4957 | 0.2810 | 1.54, 56.1 | −19.0071 |
| S2 | aspheric | −2.2917 | 0.0300 | | 0.0000 |
| S3 | aspheric | 0.8642 | 0.2500 | 1.64, 23.3 | −4.0048 |
| S4 | aspheric | 0.9600 | 0.1242 | | −1.7540 |
| STO | spherical | infinity | 0.0361 | | |
| S5 | aspheric | −102.5000 | 0.4228 | 1.54, 56.1 | 0.0000 |
| S6 | aspheric | −0.8553 | 0.6142 | | −4.3094 |
| S7 | aspheric | −0.3349 | 0.2100 | 1.64, 23.3 | −2.6222 |
| S8 | aspheric | −0.4927 | 0.0300 | | −0.9599 |
| S9 | aspheric | 0.7538 | 0.3867 | 1.54, 56.1 | −9.3178 |
| S10 | aspheric | 1.0647 | 0.4194 | | −8.5976 |
| S11 | spherical | infinity | 0.2100 | 1.52, 64.2 | |
| S12 | spherical | infinity | 0.1275 | | |
| S13 | spherical | infinity | | | |

TABLE 10

| No. of surface | A4 | A6 | A8 | A10 | A12 | A14 | A16 |
|---|---|---|---|---|---|---|---|
| S1 | 2.2628E−01 | −2.3000E−01 | 1.5900E−01 | −3.8461E−02 | −6.4631E−03 | −3.3190E−03 | 5.7915E−03 |
| S2 | 5.3595E−01 | −9.6702E−01 | 1.1750E+00 | −6.0126E−01 | −5.8463E−02 | 4.3593E−02 | 1.0851E−01 |
| S3 | −1.6717E−02 | 2.8084E−01 | −1.0716E+01 | 3.3872E+01 | −3.4467E+01 | −9.7767E−08 | −2.0614E−08 |
| S4 | −2.2574E−01 | 2.3649E+00 | −2.0547E+01 | 9.2706E+01 | 1.4225E−08 | 2.6796E−10 | 4.2606E−11 |
| S5 | −1.3829E−01 | −3.4584E−01 | −4.4209E+00 | 1.5160E+01 | 3.7899E−08 | 3.2862E−09 | 4.7759E−10 |
| S6 | −1.0445E+00 | 2.7097E−01 | −8.3261E−01 | −8.4057E+00 | −1.3183E−07 | −5.1808E−08 | −1.3111E−08 |
| S7 | −2.9138E+00 | 9.1055E+00 | −1.5631E+01 | 1.4761E+01 | −9.3330E−01 | −4.2270E+00 | −6.5226E−08 |
| S8 | −2.1645E−01 | 1.2089E+00 | 1.1378E+00 | −2.3882E−01 | −1.9111E−01 | 4.1655E−01 | |
| S9 | −2.6128E−01 | −5.9204E−02 | 4.4016E−02 | −3.1111E−02 | 7.3749E−03 | 9.5844E−05 | 6.6270E−05 |
| S10 | −8.7102E−02 | 4.1239E−02 | −2.9924E−02 | 5.1905E−03 | 1.3578E−05 | 2.4772E−05 | −2.6273E−05 |

Furthermore, $f1=-9.01$ mm; $f2=6.65$ mm; $f3=1.58$ mm; $f4=-3.39$ mm; $f5=3.29$ mm and $f=1.67$ mm; HFOV=50.1°; TTL=3.14 mm; Fno is: 2.4.

Embodiment 6

In example 6, the wide-angle imaging lens meets the conditions of the following tables:

TABLE 12

| No. of surface | A4 | A6 | A8 | A10 | A12 | A14 | A16 |
|---|---|---|---|---|---|---|---|
| S1 | 2.5083E−01 | −2.3331E−01 | 1.5750E−01 | −3.9461E−02 | −2.8139E−03 | −1.7452E−03 | 2.5934E−03 |
| S2 | 6.0009E−01 | −9.7681E−01 | 1.1545E+00 | −5.6688E−01 | −3.9494E−02 | 2.5970E−02 | 8.1483E−02 |
| S3 | −3.7003E−02 | 3.6123E−01 | −1.0351E+01 | 3.3232E+01 | −3.5384E+01 | 1.9164E+00 | −2.8148E−06 |
| S4 | −2.4516E−01 | 2.0581E+00 | −1.3966E+01 | 6.9647E+01 | 1.4878E−08 | 3.2268E−10 | 3.4509E−11 |
| S5 | −9.3750E−03 | 1.5002E−01 | −2.9517E+00 | 7.7062E+00 | 4.2422E−08 | 5.8789E−09 | 1.0056E−09 |
| S6 | −9.4153E−01 | 4.3264E−01 | −1.8191E+00 | −2.1463E+00 | −2.8274E−06 | −1.3005E−06 | −1.6417E−08 |
| S7 | −2.8277E+00 | 8.8980E+00 | −1.5691E+01 | 1.3839E+01 | −8.3534E+00 | 2.6339E−06 | 1.2188E−06 |
| S8 | −1.8884E−01 | 1.2433E+00 | 5.4653E−02 | −5.5806E−01 | −3.1336E−01 | −1.9299E−01 | 6.1924E−01 |
| S9 | 1.4770E−02 | −1.1684E−01 | 4.9459E−02 | −2.7703E−02 | 8.5817E−03 | 4.9662E−04 | −1.2171E−06 |
| S10 | 8.5565E−02 | −8.3703E−02 | −1.1333E−02 | 8.2509E−03 | −3.1491E−06 | 1.8380E−05 | −1.7119E−04 |

TABLE 11

| No. of surface | Surface type | Curvature radius | Thickness | Material (refractive index/abbe) | Conic coefficient |
|---|---|---|---|---|---|
| OBJ | spherical | infinity | 500 | | |
| S1 | aspheric | −1.2989 | 0.3215 | 1.54, 56.1 | −16.2218 |
| S2 | aspheric | −2.4830 | 0.0531 | | 0.0000 |
| S3 | aspheric | 0.7789 | 0.2636 | 1.64, 23.3 | −3.3792 |
| S4 | aspheric | 0.8569 | 0.1709 | | −1.6601 |
| STO | spherical | infinity | 0.0300 | | |
| S5 | aspheric | 3.5610 | 0.4656 | 1.54, 56.1 | 0.0000 |
| S6 | aspheric | −0.8703 | 0.5722 | | −4.1503 |
| S7 | aspheric | −0.3025 | 0.2100 | 1.64, 23.3 | −1.7958 |
| S8 | aspheric | −0.4816 | 0.0300 | | −1.0211 |
| S9 | aspheric | 1.4120 | 0.6696 | 1.54, 56.1 | −25.5325 |
| S10 | aspheric | −16.5397 | 0.2400 | | 19.9082 |
| S11 | spherical | infinity | 0.2100 | 1.52, 64.2 | |
| S12 | spherical | infinity | 0.1255 | | |
| S13 | spherical | infinity | | | |

Furthermore, $f1=-5.52$ mm; $f2=5.72$ mm; $f3=1.33$ mm; $f4=-2.33$ mm; $f5=2.41$ mm and $f=1.64$ mm; HFOV=50.1°; TTL=3.36 mm; Fno is: 2.4.

Embodiment 7

In example 7, the wide-angle imaging lens meets the conditions of the following tables:

TABLE 13

| No. of surface | Surface type | Curvature radius | Thickness | Material (refractive index/abbe) | Conic coefficient |
|---|---|---|---|---|---|
| OBJ | spherical | infinity | 500 | | |
| S1 | aspheric | -1.1846 | 0.2982 | 1.54, 56.1 | -1.8525 |
| S2 | aspheric | -1.1936 | 0.0300 | | 0.0000 |
| S3 | aspheric | -81.5000 | 0.2317 | 1.64, 23.3 | -99.0000 |
| S4 | aspheric | 3.1329 | 0.0397 | | -36.3371 |
| STO | spherical | infinity | 0.0300 | | |
| S5 | aspheric | 1.6080 | 0.4561 | 1.54, 56.1 | 0.0000 |
| S6 | aspheric | -1.1267 | 0.7265 | | -7.4310 |
| S7 | aspheric | -0.2889 | 0.2100 | 1.64, 23.3 | -2.3932 |
| S8 | aspheric | -0.5381 | 0.0300 | | -1.0740 |
| S9 | aspheric | 0.6798 | 0.5309 | 1.54, 56.1 | -9.0999 |
| S10 | aspheric | 2.2247 | 0.3728 | | -8.2942 |
| S11 | spherical | infinity | 0.2100 | 1.52, 64.2 | |
| S12 | spherical | infinity | 0.1156 | | |
| S13 | spherical | infinity | | | |

TABLE 14

| No. of surface | A4 | A6 | A8 | A10 | A12 | A14 | A16 |
|---|---|---|---|---|---|---|---|
| S1 | 2.7405E-01 | -1.8325E-01 | -4.5722E-02 | -1.1453E-01 | 2.0421E-01 | 2.6316E-01 | -3.0728E-01 |
| S2 | 6.7437E-01 | -1.2387E+00 | 1.1551E+00 | -1.0215E-01 | 9.2057E-02 | -2.6614E-01 | -1.9718E-01 |
| S3 | -4.7809E-01 | 1.4921E+00 | -6.9443E+00 | 3.0240E+01 | -3.4467E+00 | -5.2768E-08 | -1.6689E-08 |
| S4 | -6.6715E-01 | 1.2733E+00 | -4.7483E+00 | 1.8588E+01 | 1.2487E-08 | -3.6714E-11 | -7.4529E-12 |
| S5 | -3.4136E-01 | -1.2921E-02 | -3.9744E+00 | 7.0749E+00 | 4.4085E-08 | 4.5523E-09 | 7.3401E-10 |
| S6 | -7.6132E-01 | 4.6548E-01 | -1.6930E+00 | -1.5009E+00 | -1.7025E-07 | -6.6003E-08 | -1.7066E-08 |
| S7 | -2.5677E+00 | 9.5605E+00 | -1.5248E+01 | 1.4211E+01 | -5.8742E+00 | -1.2618E-07 | -8.3895E-08 |
| S8 | -1.5476E+00 | 1.3966E+00 | 1.8812E-01 | -5.7212E-01 | -5.7726E-01 | -3.2351E-01 | 1.0576E+00 |
| S9 | 1.9765E-02 | -1.3743E-01 | 7.8973E-02 | -3.5789E-02 | 5.0871E-03 | 1.4347E-03 | 2.1221E-04 |
| S10 | -2.4051E-02 | -2.3700E-02 | -6.3361E-03 | 1.5440E-02 | -9.0814E-03 | 2.5861E-03 | -3.5383E-04 |

Furthermore, f1=26.89 mm; f2=-4.68 mm; f3=1.29 mm; f4=-1.44 mm; f5=1.6 mm and f=1.67 mm; HFOV=50.4°; TTL=3.29 mm; Fno is: 2.4.

Embodiment 8

In example 8, the wide-angle imaging lens meets the conditions of the following tables:

TABLE 16

| No. of surface | A4 | A6 | A8 | A10 | A12 | A14 | A16 |
|---|---|---|---|---|---|---|---|
| S1 | 1.9136E-01 | -1.9275E-01 | 1.2362E-01 | -4.0469E-02 | 1.7746E-03 | 3.3009E-03 | -5.8310E-04 |
| S2 | 5.3636E-01 | -1.0414E+00 | 1.4168E+00 | -1.2575E+00 | 6.9233E-01 | -2.0925E-01 | 2.7029E-02 |
| S3 | 1.9999E-01 | -3.1287E-01 | -5.3841E+00 | 1.6330E+01 | -1.1331E+01 | -1.1564E+01 | 1.2835E+01 |
| S4 | -4.1175E-01 | -3.6853E+00 | 1.2568E+02 | -1.4192E+03 | 8.7046E+03 | -2.7786E+04 | 3.8743E+04 |
| S5 | -2.9455E-02 | 1.0625E+00 | -1.3099E+01 | 2.3686E+01 | 3.8406E+02 | -2.5824E+03 | 4.7909E+03 |
| S6 | -1.0268E+00 | -4.1852E-02 | 6.7329E+00 | -7.6722E+01 | 3.9711E+02 | -1.0056E+03 | 9.6981E+02 |
| S7 | -5.3112E+00 | 3.6213E+01 | -1.7763E+02 | 6.0233E+02 | -1.2503E+03 | 1.4028E+03 | -6.3796E+02 |
| S8 | -6.1159E-01 | 4.3397E+00 | -9.2918E+00 | 1.6788E+01 | -2.1936E+01 | 1.5904E+01 | -4.5592E+00 |
| S9 | -2.9412E-01 | 4.5953E-01 | -5.4654E-01 | 3.9348E-01 | -1.5674E-01 | 3.2894E-02 | -3.0259E-03 |
| S10 | -3.1121E-01 | 3.4525E-01 | -2.7483E-01 | 1.4530E-01 | -4.9809E-02 | 9.9246E-03 | -8.5284E-04 |

TABLE 15

| No. of surface | Surface type | Curvature radius | Thickness | Material (refractive index/abbe) | Conic coefficient |
|---|---|---|---|---|---|
| OBJ | spherical | infinity | 500 | | |
| S1 | aspheric | -3.8531 | 0.3473 | 1.54, 56.1 | -61.0087 |
| S2 | aspheric | -2.2184 | 0.0290 | | -2.0244 |
| S3 | aspheric | 0.8128 | 0.2476 | 1.64, 23.3 | -3.8294 |
| S4 | aspheric | 0.6091 | 0.2399 | | -1.3804 |
| STO | spherical | infinity | -0.0080 | | |
| S5 | aspheric | 2.0453 | 0.4597 | 1.54, 56.1 | -7.0424 |
| S6 | aspheric | -0.9570 | 0.3935 | | -5.4613 |
| S7 | aspheric | -0.4398 | 0.2472 | 1.64, 23.3 | -5.5478 |
| S8 | aspheric | -0.6333 | 0.0295 | | -1.1760 |
| S9 | aspheric | 1.3885 | 0.5041 | 1.54, 56.1 | -27.8626 |
| S10 | aspheric | 1.2027 | 0.4515 | | -5.4966 |
| S11 | spherical | infinity | 0.1450 | 1.52, 64.2 | |
| S12 | spherical | infinity | 0.0794 | | |
| S13 | spherical | infinity | | | |

Furthermore, f1=8.91 mm; f2=-7.21 mm; f3=1.26 mm; f4=-4.48 mm; f5=-389.8 mm and f=1.87 mm; HFOV=50.4°; TTL=3.17 mm; Fno is: 2.4.

Embodiment 9

In example 9, the wide-angle imaging lens meets the conditions of the following tables:

TABLE 17

| No. of surface | Surface type | Curvature radius | Thickness | Material (refractive index/abbe) | Conic coefficient |
|---|---|---|---|---|---|
| OBJ | spherical | infinity | 500 | | |
| S1 | aspheric | −1.9335 | 0.4171 | 1.54, 56.1 | −38.1129 |
| S2 | aspheric | 100.0000 | 0.0374 | | 0.0000 |
| S3 | aspheric | 0.7600 | 0.2759 | 1.65, 21.5 | −2.3926 |
| S4 | aspheric | 0.9255 | 0.1511 | | −0.9954 |
| STO | spherical | infinity | 0.0300 | | |
| S5 | aspheric | 2.7901 | 0.4213 | 1.54, 56.1 | 0.0000 |
| S6 | aspheric | −0.9413 | 0.4260 | | −4.2437 |
| S7 | aspheric | −0.4603 | 0.2120 | 1.64, 23.3 | −4.6115 |
| S8 | aspheric | −0.6576 | 0.0300 | | −0.8368 |
| S9 | aspheric | 0.6442 | 0.3518 | 1.54, 56.1 | −8.7024 |
| S10 | aspheric | 0.6692 | 0.3701 | | −3.8482 |
| S11 | spherical | infinity | 0.2100 | 1.52, 64.2 | |
| S12 | spherical | infinity | 0.1484 | | |
| S13 | spherical | infinity | | | |

TABLE 18

| No. of surface | A4 | A6 | A8 | A10 | A12 | A14 | A16 |
|---|---|---|---|---|---|---|---|
| S1 | 2.8094E−01 | −2.4629E−01 | 1.6045E−01 | −4.2426E−02 | −1.6020E−03 | 8.8704E−04 | 1.7964E−03 |
| S2 | 4.1581E−01 | −9.0140E−01 | 1.1998E+00 | −5.0345E−01 | −1.0609E−01 | −6.4743E−02 | 3.3751E−01 |
| S3 | −2.6178E−01 | 1.9570E−01 | −1.0444E+01 | 4.0465E+01 | −3.8925E+01 | −5.5272E+01 | 9.5600E+01 |
| S4 | −2.1507E−01 | −1.3181E+00 | 4.4267E+01 | −4.5905E+02 | 3.1240E+03 | −1.1780E+04 | 2.3386E+04 |
| S5 | 1.4111E−02 | −2.3844E−01 | 3.4206E−01 | −6.1746E−01 | 6.0555E−11 | 1.2213E−11 | −3.6442E−13 |
| S6 | −9.5796E−01 | 2.6958E−01 | −3.8124E+00 | 4.1380E+00 | −6.7956E−10 | 6.2406E−11 | 1.8482E−11 |
| S7 | −2.4202E+00 | −2.5952E+00 | 7.9634E+00 | −5.0710E+00 | 1.7082E+03 | −3.0135E+03 | 2.1424E+03 |
| S8 | −9.8994E−01 | 4.9643E+00 | −1.5449E+01 | 4.8685E+01 | −8.6706E+01 | 7.3868E+01 | −2.3849E+01 |
| S9 | −5.1711E−01 | 7.7134E−01 | −6.5209E−01 | 2.0056E−01 | 7.0432E−02 | −6.1618E−02 | 1.1254E−02 |
| S10 | −5.6192E−01 | 8.3563E−01 | −8.8777E−01 | 6.3608E−01 | −2.9816E−01 | 7.9529E−02 | −8.9651E−03 |

Furthermore, f1=−3.47 mm; f2=3.53 mm; f3=1.35 mm; f4=−4.11 mm; f5=5.29 mm and f=1.51 mm; HFOV=51.2°; TTL=3.08 mm; Fno is: 2.4.

Embodiment 10

In example 10, the wide-angle imaging lens meets the conditions of the following tables:

TABLE 20

| No. of surface | A4 | A6 | A8 | A10 | A12 | A14 | A16 |
|---|---|---|---|---|---|---|---|
| S1 | 2.2157E−01 | −2.0088E−01 | 1.2530E−01 | −4.0059E−02 | 1.1326E−03 | 3.1043E−03 | −6.1086E−04 |
| S2 | 5.4099E−01 | −1.0378E+00 | 1.4149E+00 | −1.2580E+00 | 6.9109E−01 | −2.1015E−01 | 2.6779E−02 |
| S3 | 2.7832E−01 | −3.0555E−01 | −5.2556E+00 | 1.6535E+01 | −9.6971E+00 | −2.0520E+01 | 2.1095E+01 |
| S4 | −3.1428E−01 | −1.4829E+00 | 9.4170E+01 | −1.3262E+03 | 9.4893E+03 | −3.3350E+04 | 4.7638E+04 |
| S5 | −7.2282E−02 | 1.4951E+00 | −1.0161E+01 | 2.4741E+02 | 4.4338E+02 | −2.0933E+03 | 3.0106E+03 |
| S6 | −8.7461E−01 | 8.2234E−02 | 6.4254E+00 | −7.2370E+01 | 3.9298E+02 | −1.0365E+03 | 1.1132E+03 |
| S7 | −5.1650E+00 | 3.6153E+01 | −1.7746E+02 | 6.0197E+02 | −1.2527E+03 | 1.4022E+03 | −6.3851E+02 |
| S8 | −6.6412E−01 | 4.3815E+00 | −9.3312E+00 | 1.6723E+01 | −2.1974E+01 | 1.5888E+01 | −4.6041E+00 |
| S9 | −2.6203E−01 | 4.5579E−01 | −5.4991E−01 | 3.9216E−01 | −1.5692E−01 | 3.2987E−02 | −2.8534E−03 |
| S10 | −3.2098E−01 | 3.5214E−01 | −2.7773E−01 | 1.4486E−01 | −4.9801E−02 | 9.9530E−03 | −8.4178E−04 |

TABLE 19

| No. of surface | Surface type | Curvature radius | Thickness | Material (refractive index/abbe) | Conic coefficient |
|---|---|---|---|---|---|
| OBJ | spherical | infinity | 500 | | |
| S1 | aspheric | −2.3837 | 0.4180 | 1.54, 56.1 | −35.3361 |

TABLE 19-continued

| No. of surface | Surface type | Curvature radius | Thickness | Material (refractive index/abbe) | Conic coefficient |
|---|---|---|---|---|---|
| S2 | aspheric | −2.5926 | 0.0295 | | −2.2387 |
| S3 | aspheric | 0.7633 | 0.2530 | 1.64, 23.3 | −3.2043 |
| S4 | aspheric | 0.6726 | 0.2507 | | −1.1637 |
| STO | spherical | infinity | −0.0028 | | |
| S5 | aspheric | 3.2763 | 0.5261 | 1.54, 56.1 | −9.8078 |
| S6 | aspheric | −0.9366 | 0.3915 | | −4.5793 |
| S7 | aspheric | −0.3828 | 0.2481 | 1.64, 23.3 | −4.7044 |
| S8 | aspheric | −0.6687 | 0.0295 | | −1.0236 |
| S9 | aspheric | 1.0314 | 0.6671 | 1.54, 56.1 | −23.5180 |
| S10 | aspheric | 1.8693 | 0.4682 | | −8.0287 |
| S11 | spherical | infinity | 0.1450 | 1.52, 64.2 | |
| S12 | spherical | infinity | 0.2000 | | |
| S13 | spherical | infinity | | | |

Furthermore, f1=−184.7 mm; f2=93.58 mm; f3=1.4 mm; f4=−2.11 mm; f5=3.29 mm and f=1.94 mm; HFOV=51.5°; TTL=3.62 mm; Fno is: 2.4.

In examples 1 to 10, each formula meets the conditions of the following tables:

| Formula | Example | | | | | | | | | |
|---|---|---|---|---|---|---|---|---|---|---|
| | 1 | 2 | 3 | 4 | 5 | 6 | 7 | 8 | 9 | 10 |
| TTL/ImgH | 1.50 | 1.48 | 1.57 | 1.34 | 1.50 | 1.63 | 1.64 | 1.39 | 1.64 | 1.51 |
| V1 − V2 | 32.82 | 32.82 | 32.82 | 32.82 | 32.82 | 32.82 | 32.82 | 32.82 | 34.59 | 32.82 |
| f/f4 | −0.86 | −1.25 | −1.11 | −0.47 | −0.49 | −0.70 | −1.15 | −0.42 | −0.37 | −0.92 |
| Dr1r4/TTL | 0.16 | 0.19 | 0.19 | 0.18 | 0.18 | 0.19 | 0.17 | 0.20 | 0.24 | 0.19 |
| |SAG41/SD41| | 0.80 | 0.80 | 0.72 | 0.69 | 0.76 | 0.91 | 0.68 | 0.58 | 0.70 | 0.62 |
| tan(HFOV)/TTL | 0.35 | 0.36 | 0.36 | 0.44 | 0.38 | 0.36 | 0.37 | 0.38 | 0.40 | 0.35 |

Although explanatory embodiments of the present invention have been shown and described, it would be appreciated by those ordinary skilled in the art that various changes, modifications, alternatives and variants can be made in these embodiments without departing from principles and spirits of the present invention, and the scope of the present invention is restricted by claims and their equivalents.

What is claimed is:

1. A wide-angle imaging lens, comprising a first lens, a second lens, a third lens, a fourth lens and a fifth lens from an object side of the wide-angle imaging lens to an image side of the wide-angle imaging lens in turn, wherein
   the first lens is of a focal power, an object side surface of the first lens close to an axis is concave;
   the second lens is of a focal power, an image side surface of the second lens is concave;
   the third lens is of a positive focal power, an image side surface of the third lens is convex;
   the fourth lens is of a negative focal power, an object side surface of the fourth lens is concave and in a meniscus shape;
   the fifth lens is of a focal power, an object side surface of the fifth lens close to the axis is convex, and at least one inflection point is present in at least one of the object side surface and an image side surface of the fifth lens; and
   the wide-angle imaging lens meets the following formulas:

$TTL/\mathrm{Img}H<1.7$; and $-1.4<f/f4<0$, wherein TTL is a total length of the wide-angle imaging lens,
   ImgH equals to half of a diameter of an effective pixel region at an imaging side surface,
   f represents an effective focal length of the wide-angle imaging lens, and
   f4 represents an effective focal length of the fourth lens.

2. The wide-angle imaging lens according to claim 1, wherein the wide-angle imaging lens comprises an aperture stop arranged between the second lens and the third lens.

3. The wide-angle imaging lens according to claim 2, wherein the fifth lens is of a positive focal power, and the image side surface of the fifth lens close to the axis is concave.

4. The wide-angle imaging lens according to claim 1, wherein the wide-angle imaging lens meets the following formula:

$25<V1-V2<45$, wherein V1 represents a dispersion coefficient of the first lens and V2 represents a dispersion coefficient of the second lens.

5. The wide-angle imaging lens according to claim 4, wherein the fifth lens is of a positive focal power, and the image side surface of the fifth lens close to the axis is concave.

6. The wide-angle imaging lens according to claim 1, wherein the wide-angle imaging lens meets the following formula:

$0<Dr1r4/TTL<0.25$, wherein Dr1r4 represents a distance from the object side surface of the first lens to the image side surface of the second lens along the axial direction, and
   TTL is the total length of the wide-angle imaging lens.

7. The wide-angle imaging lens according to claim 6, wherein the fifth lens is of a positive focal power, and the image side surface of the fifth lens close to the axis is concave.

8. The wide-angle imaging lens according to claim 1, wherein the wide-angle imaging lens meets the following formula:

$|SAG41|/SD41|\geq 0.56$, wherein SAG41 is a vector height of the object side surface of the fourth lens, and
   SD41 is a maximal effective radius of the object side surface of the fourth lens.

9. The wide-angle imaging lens according to claim 8, wherein the fifth lens is of a positive focal power, and the image side surface of the fifth lens close to the axis is concave.

10. The wide-angle imaging lens according to claim 1, wherein the wide-angle imaging lens meets the following formula:

$\tan(HFOV)/TTL>0.32$, wherein HFOV is half of a maximal field angle of the wide-angle imaging lens, and
    TTL is the total length of the wide-angle imaging lens.

11. The wide-angle imaging lens according to claim 10, wherein the fifth lens is of a positive focal power, and the image side surface of the fifth lens close to the axis is concave.

12. The wide-angle imaging lens according to claim 1, wherein the fifth lens is of a positive focal power, and the image side surface of the fifth lens close to the axis is concave.

13. The wide-angle imaging lens according to claim 12, wherein an object side surface of the second lens is convex.

14. The wide-angle imaging lens according to claim 13, wherein an image side surface of the first lens close to the axis is convex.

15. The wide-angle imaging lens according to claim 14, wherein an object side surface of the third lens is convex.

* * * * *